Sept. 3, 1940.  C. FAURE-ROUX  2,213,810
SHOCK ABSORBER
Filed April 21, 1937
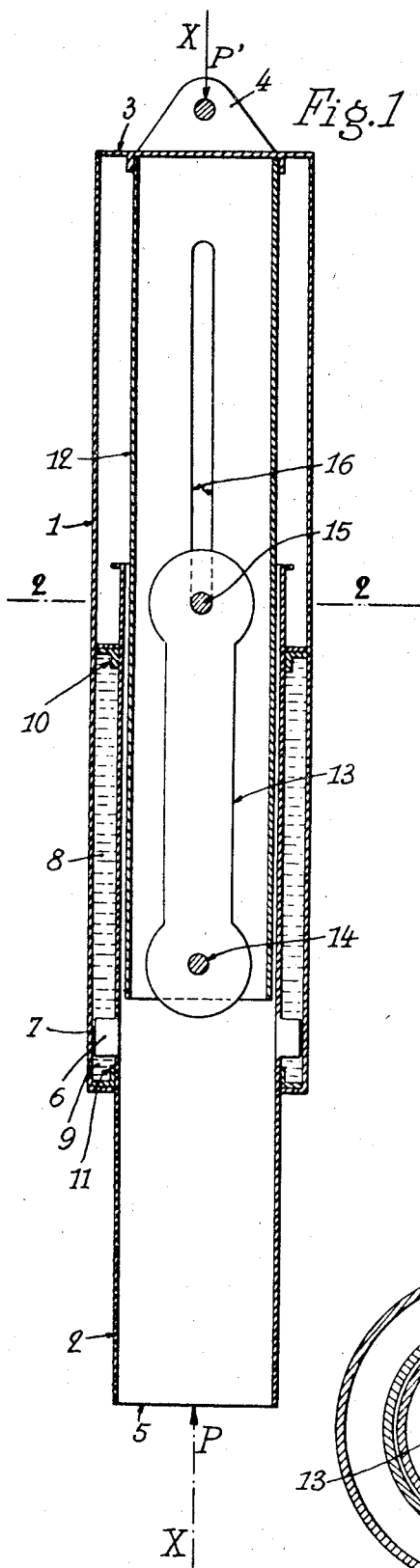
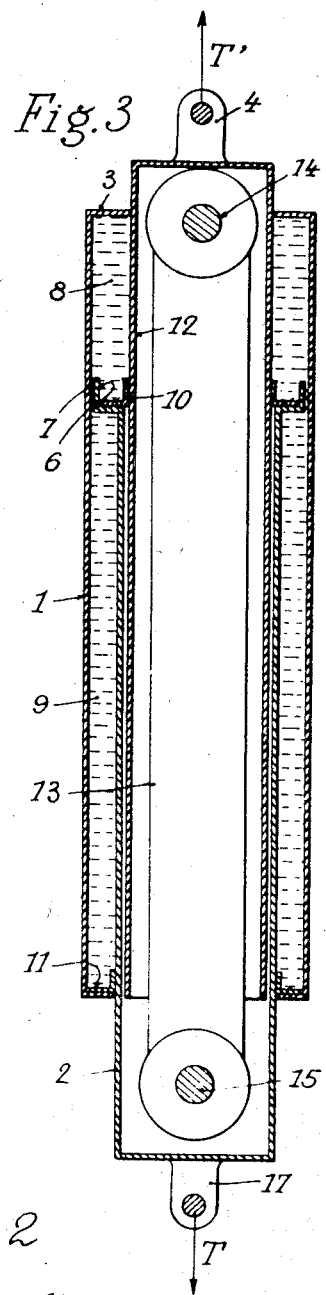
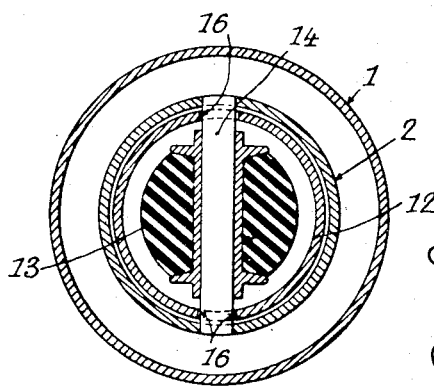
Charles Faure-Roux
INVENTOR Patented Sept. 3, 1940

2,213,810

UNITED STATES PATENT OFFICE 2,213,810

SHOCK ABSORBER

Charles Faure-Roux, Saint-Chamond, France, assignor to Etablissements Ch. Faure-Roux, Saint-Chamond, Loire, France Application April 21, 1937, Serial No. 138,096
In France April 27, 1936

1 Claim. (Cl. 267—35)

The present invention relates to a shock absorber of the type comprising, in combination, an oil brake and a rubber extensible device, the said shock absorber being chiefly characterized by the fact that the extensible device (single or with several parts) is mounted in the interior of the oil brake and is coaxial with the latter.

This arrangement permits of obtaining greater lengths of movement for a given length of the whole apparatus in the idle position, than in the case of a series mounting of a brake and a coaxial extensible device. In fact, for the same total length, the length of the extensible device in the idle position can be greater, and thus the length of movement is greater; this length of movement is evidently a direct function of the length of the extensible device when in the idle position.

In the accompanying drawing, which is given solely by way of example:

Fig. 1 is a diagrammatic longitudinal section of a shock absorber in conformity with the invention, which is adapted to operate by compression.

Fig. 2 is a cross-section of the same on the line 2—2 of Fig. 1, on a larger scale.

Fig. 3 is a diagrammatic longitudinal section of a modification, which is adapted to operate by extension.

In the embodiment represented in Figs. 1 and 2, the main body of the shock absorber, whose longitudinal axis is X—X, consists of two coaxial tubes 1 and 2. The tube 1 has a closed end 3 provided with a device 4 for attaching the apparatus to one of the two parts or groups of parts which are to be connected together by the shock absorber and whose relative displacements are to be dampened or braked, and especially when coming together.

The outer tube 2 is connected, at 5 with the other part or group of parts, and for instance by a simple surface of contact.

The tube 2 carries a shoulder 6 forming a piston in the cylinder 1, leaving a narrow annular passage 7, thus providing two chambers 8 and 9 whose size will vary according to the relative longitudinal positions of the tubes 1 and 2. The chambers 8 and 9 are closed at the other ends by automatic packing members 10 and 11, which ensure non-leaking conditions for the cylinder. The two chambers 8 and 9 are filled with oil or other liquid.

In the interior of the tubular body 1, and in the coaxial position, is rigidly secured to the closed end 3, a tube 12. In the said tube 12 is mounted an extensible rubber device 13 consisting of a single part or of several parts side by side. The said extensible device 13 is secured by its ends, respectively to the end of the tube 12 and to the end of the piston tube 2 by means of connecting axles 14 and 15. The axle 15 traverses the tube 12 through longitudinal slots 16 formed in the said tube.

The operation is as follows. By the action of the forces P and P' which are equal and in contrary directions, exerted upon the shock absorber (one of these forces may consist of a simple resistance), the tubular piston 2 moves into the cylinder 1 and produces a braking effect by acting upon the oil in the annular space 7, this oil being driven from the chamber 8 to the chamber 9.

At the same time, the extensible device 13, which is secured to the tube 12 by the axle 14 and to the tubular piston rod 2 by the axle 15, is obliged to lengthen, and the axle 15 slides in the slots 16. The extensible device counterbalances the forces P+P', and it then returns the piston 2—6 to its initial position when the forces P and P' cease to operate.

The braking effect which is obtained during the return movement by acting upon the oil in the annular space 7, which oil is obliged to pass from the chamber 9 to the chamber 8, will absorb, in conjunction with the suspended mass or masses, the whole of the energy restored by the extensible device, and thus the said masses will not rebound.

It should be noted that the two parts or groups of parts which are connected together by the shock absorber, may be movable, or only one of these may be movable.

Fig. 3 shows a modified form of shock absorber, which operates by traction. The extensible device is connected by an axle 14 to the tube 12 and by an axle 15 to the tube 2 which forms a piston rod.

Under the effect of the forces of traction T and T', one of which forces may be reduced to a resistance (if the attaching part 4 or 17 is stationary), the piston 2 will partially move out of the annular cylinder 1, thus producing a braking effect by acting upon the oil in the annular space 7.

The extensible device 13 is lengthened under the action of the forces T and T', which it counterbalances, and it then brings the piston to its initial position when the traction ceases.

The energy restored by the extensible device during its return movement is absorbed simultaneously and entirely by the oil brake and by the suspended mass or masses.

This arrangement permits of reducing the total length of the apparatus when in the idle position, to a length which hardly exceeds that of the extensible device, i. e., to the stroke of the shock absorber in the case in which the maximum elongation of the said extensible device is 100%.

Obviously, the said invention is not limited to the embodiments herein described and represented, which are given solely by way of example.

Having now described my invention what I claim as new and desire to secure by Letters Patent is:

A shock absorber between two parts movable with relation to each other comprising in combination a cylinder adapted to be connected with one of said parts, a piston adapted to be reciprocated in said cylinder and dividing said cylinder into two compartments while providing a passage of reduced section between said compartments, a hollow rod secured on said piston adapted to slide through the two end walls of said cylinder and to be connected with the other of said parts, a tubular member extending in said hollow rod and on both sides of one end wall of said cylinder and connected with said cylinder, said hollow rod with said tubular member forming an axial chamber without communication with said compartments, at least one longitudinal slot being provided in said tubular member in the portion situated on the outer side of said one end wall of said cylinder, a fluid in said cylinder adapted to pass from one of said compartments into the other through said passage of reduced section when said piston is displaced in said cylinder, an elastic extensible device extending in said axial chamber at least partially between the end walls of said cylinder when in the contracted position and connected at one end with said tubular member, and connecting means adapted to slide in said slot and to connect the other end of said extensible device with said hollow rod.

CHARLES FAURE-ROUX.